United States Patent Office.

CHASE A. STEVENS, OF NEW YORK, N. Y., ASSIGNOR TO ABIJAH RICHARDSON, OF BOSTON, MASSACHUSETTS.

Letters Patent No. 112,648, dated March 14, 1871.

IMPROVEMENT IN FIBROUS MINERAL PACKINGS FOR JOURNALS, BEARINGS, &c.

The Schedule referred to in these Letters Patent and making part of the same.

*To all whom it may concern:*

Be it known that I, CHASE A. STEVENS, of the city and State of New York, have invented a new and improved Material for Packing for Journals and other Parts of Machinery; and I do hereby declare the following to be a full, clear, and exact description thereof, which will enable those skilled in the art to make and use the same.

This invention relates to packing made from pure asbestus, amianthus, or other fibrous mineral.

In carrying out my invention I subject crude asbestus or other fibrous mineral to treatment with suitable acids, or other means, so as to disintegrate and bring it to a fibrous condition, after which I subject it to the operation of "picking" by suitable machinery, similar to the operation of picking cotton and wool, whereby I bring it to a fine, flexible, and loose or flocky condition. In this state the asbestus or other fibrous minerals is suitable for packing journal-boxes of car-axles and bearings of heavy shafting, and wherever loose packing can be used. Such fibrous minerals possess in themselves lubricating qualities which enable me to dispense, in some cases, with the use of oil with my packing, but it can be used with or without the addition of oil or other lubricators.

When additional lubricating is preferred I saturate the asbestus and other fibrous minerals with suitable oils, such, for example, as lard-oil, but use much less in quantity than is common with cotton-waste packing.

Said packing is a poor conductor of heat and electricity, and does not promote the generation of heat like cotton or other vegetable packing in the presence of oil. It is at the same time a better absorbent of oils than either vegetable or animal fibers, and the oil is more thoroughly diffused and disseminated through the mass than is the case with such other packings, and it retains the oil in absorption without much evaporation or volatilization. It is, moreover, elastic and durable to a high degree, and is not combustible at a temperature below about two thousand degrees.

What I claim as new, and desire to secure by Letters Patent, is—

A packing for journals and other parts of machinery, prepared from asbestus, amianthus, or other fibrous mineral, substantially as and for the purposes set forth, so as to free said fibrous minerals from all earthy matter and grit and produce a clean flocky fiber, highly lubricating, and indestructible by heat or acids.

In testimony whereof I have signed my name to this specification in the presence of two subscribing witnesses.

C. A. STEVENS.

Witnesses:
A. P. THAYER,
S. H. WALES.